(12) United States Patent
Jones et al.

(10) Patent No.: US 11,811,549 B2
(45) Date of Patent: Nov. 7, 2023

(54) LOAD CONTROL SYSTEM HAVING AUDIO OUTPUT DEVICES

(71) Applicant: Lutron Technology Company LLC, Coopersburg, PA (US)

(72) Inventors: Christopher M. Jones, St. Davids, PA (US); Neil R. Orchowski, Plymouth Meeting, PA (US); David T. Saveri, III, Nazareth, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/744,906

(22) Filed: May 16, 2022

(65) Prior Publication Data

US 2022/0278868 A1 Sep. 1, 2022

Related U.S. Application Data

(63) Continuation of application No. 16/665,724, filed on Oct. 28, 2019, now Pat. No. 11,336,477, which is a
(Continued)

(51) Int. Cl.
*H04L 12/28* (2006.01)
*H04N 21/233* (2011.01)
(Continued)

(52) U.S. Cl.
CPC ........ *H04L 12/2816* (2013.01); *G06F 3/0482* (2013.01); *H04L 12/282* (2013.01);
(Continued)

(58) Field of Classification Search
CPC ............... H04L 12/2816; H04L 12/282; H04L 12/2838; H04L 67/025; H04L 2012/2849;
(Continued)

(56) References Cited

U.S. PATENT DOCUMENTS 5,440,644 A 8/1995 Farinelli et al.
5,905,442 A 5/1999 Mosebrook et al.
(Continued)

FOREIGN PATENT DOCUMENTS

| CA | 2805507 A1 * | 2/2012 | ................ H02J 3/14 |
| CN | 1380612 A * | 11/2002 | |
| WO | WO-2012112715 A2 * | 8/2012 | ........... G06F 1/1626 |

*Primary Examiner* — Crystal J Barnes-Bullock
(74) *Attorney, Agent, or Firm* — Michael Czarnecki; Glen Farbanish; Philip Smith

(57) ABSTRACT

A control system may comprise a plurality of audio output devices (e.g., controllable speakers), and a remote control device having at least one button for selecting a preset, where the preset defines different commands for at least two of the audio output devices. The at least two audio output devices may be configured to be controlled according to the different commands (e.g., starting, pausing, or stopping playback, adjusting volume, etc.) in response to an actuation of the button of the remote control device. The control system may also comprise a load control device, such as a dimmer configured to control an intensity of a lighting load to a predetermined intensity in response to the actuation of the button of the remote control device to select the preset. The audio output device may be configured to play a feedback signal indicating an operational characteristic of the dimmer.

18 Claims, 5 Drawing Sheets

Related U.S. Application Data continuation of application No. 15/688,179, filed on Aug. 28, 2017, now Pat. No. 10,461,953.

(60) Provisional application No. 62/380,815, filed on Aug. 29, 2016.

(51) Int. Cl.

| | | |
|---|---|---|
| *H04N 21/2387* | (2011.01) | |
| *G06F 3/0482* | (2013.01) | |
| *H04L 67/025* | (2022.01) | |
| *H04R 29/00* | (2006.01) | |
| *H04N 21/41* | (2011.01) | |
| *H04N 21/485* | (2011.01) | |
| *H04N 21/436* | (2011.01) | |
| *H04N 21/432* | (2011.01) | |
| *H04N 21/81* | (2011.01) | |
| *H04N 21/422* | (2011.01) | |
| *H04N 21/439* | (2011.01) | |
| *H05B 47/19* | (2020.01) | |
| *H05B 45/12* | (2020.01) | |
| *H04R 27/00* | (2006.01) | |

(52) U.S. Cl.
CPC ........ *H04L 12/2838* (2013.01); *H04L 67/025* (2013.01); *H04N 21/233* (2013.01); *H04N 21/2387* (2013.01); *H04N 21/4122* (2013.01); *H04N 21/4126* (2013.01); *H04N 21/4131* (2013.01); *H04N 21/41265* (2020.08); *H04N 21/42204* (2013.01); *H04N 21/439* (2013.01); *H04N 21/4325* (2013.01); *H04N 21/43615* (2013.01); *H04N 21/4852* (2013.01); *H04N 21/8106* (2013.01); *H04R 29/008* (2013.01); *H05B 45/12* (2020.01); *H05B 47/19* (2020.01); *G08C 2201/30* (2013.01); *G08C 2201/41* (2013.01); *H04L 2012/2849* (2013.01); *H04R 27/00* (2013.01); *H04R 2227/005* (2013.01); *H04R 2420/07* (2013.01); *H04R 2430/01* (2013.01)

(58) Field of Classification Search
CPC ............. H04N 21/233; H04N 21/2387; H04N 21/4122; H04N 21/4126; H04N 21/41265; H04N 21/4131; H04N 21/42204; H04N 21/4325; H04N 21/43615; H04N 21/439; H04N 21/4852; H04N 21/8106; H04R 27/00; H04R 29/008; H04R 2227/005; H04R 2420/07; H04R 2430/01; H05B 45/12; H05B 47/19; G06F 3/0482; G08C 2201/30; G08C 2201/41

See application file for complete search history.

(56) References Cited

U.S. PATENT DOCUMENTS

| | | | |
|---|---|---|---|
| 6,380,696 | B1 | 4/2002 | Sembhi et al. |
| 6,803,728 | B2 | 10/2004 | Balasubramaniam et al. |
| 6,992,612 | B2 | 1/2006 | Pessina et al. |
| 7,142,932 | B2 | 11/2006 | Spira et al. |
| 7,346,332 | B2 | 3/2008 | McCarty et al. |
| 7,573,208 | B2 | 8/2009 | Newman, Jr. |
| 7,664,273 | B2 | 2/2010 | Christensen et al. |
| 7,805,210 | B2 | 9/2010 | Cucos et al. |
| 8,330,638 | B2 | 12/2012 | Altonen et al. |
| 8,483,853 | B1 | 7/2013 | Lambourne |
| 8,725,125 | B2 | 5/2014 | Klappert et al. |
| 8,749,487 | B2 | 6/2014 | Mishima et al. |
| 8,866,343 | B2 | 10/2014 | Abraham et al. |
| 8,917,888 | B2 | 12/2014 | Nakamura |
| 9,285,886 | B2 | 3/2016 | Reilly et al. |
| 9,288,596 | B2 | 3/2016 | Gossain et al. |
| 9,325,827 | B2 | 4/2016 | Mirza et al. |
| 9,467,737 | B2 | 10/2016 | Coburn, IV et al. |
| 9,547,964 | B2 | 1/2017 | Skotty et al. |
| 9,553,451 | B2 | 1/2017 | Zacharchuk et al. |
| 9,560,460 | B2 | 1/2017 | Chaikin et al. |
| 9,655,217 | B2 * | 5/2017 | Recker .................. H05B 47/16 |
| 9,860,965 | B2 * | 1/2018 | Recker ................ H05B 47/105 |
| 9,888,543 | B2 | 2/2018 | Chitta et al. |
| 9,985,436 | B2 | 5/2018 | Courtney et al. |
| 10,034,359 | B2 * | 7/2018 | Recker ...................... H02J 9/02 |
| 10,051,228 | B2 | 8/2018 | Ishihara et al. |
| 10,461,953 | B2 * | 10/2019 | Jones ..................... H05B 45/12 |
| 11,336,477 | B2 * | 5/2022 | Jones ............... H04N 21/41265 |
| 2005/0018857 | A1 | 1/2005 | Jouppi et al. |
| 2005/0069153 | A1 | 3/2005 | Hall et al. |
| 2005/0177256 | A1 | 8/2005 | Shintani et al. |
| 2006/0140170 | A1 | 6/2006 | Dorner |
| 2006/0156353 | A1 | 7/2006 | Dorner |
| 2006/0205349 | A1 | 9/2006 | Passier et al. |
| 2006/0251263 | A1 | 11/2006 | Vronay |
| 2007/0297620 | A1 | 12/2007 | Choy |
| 2010/0060418 | A1 * | 3/2010 | Tarizzo .................. H04B 1/202 |
| | | | 340/5.83 |
| 2011/0063215 | A1 | 3/2011 | Mishima et al. |
| 2011/0311072 | A1 | 12/2011 | Waller, Jr. |
| 2012/0057725 | A1 | 3/2012 | Nakamura |
| 2013/0253679 | A1 | 9/2013 | Lambourne |
| 2015/0312394 | A1 | 10/2015 | Mirza et al. |
| 2016/0027262 | A1 | 1/2016 | Skotty et al. |
| 2016/0139875 | A1 | 5/2016 | Tripplett |

* cited by examiner

LOAD CONTROL SYSTEM HAVING AUDIO OUTPUT DEVICES

CROSS-REFERENCE TO RELATED APPLICATIONS

This application is a continuation of U.S. patent application Ser. No. 16/665,724, filed Oct. 28, 2019; which is a continuation of U.S. patent application Ser. No. 15/688,179, filed Aug. 28, 2017, now U.S. Pat. No. 10,461,953 issued Oct. 29, 2019; which claims the benefit of U.S. Provisional Patent Application No. 62/380,815, filed Aug. 29, 2016, the entire disclosures of which are hereby incorporated by reference.

BACKGROUND

Home automation systems, which have become increasingly popular, may be used by homeowners to integrate and control multiple electrical and/or electronic devices in their house. For example, a homeowner may connect appliances, lights, window treatments, thermostats, audio systems, speakers, cable or satellite boxes, security systems, telecommunication systems, and the like to each other via a wireless network. The homeowner may control these devices using a controller or user interface provided via a smart phone, a tablet, a computer, and the like directly connected to the network or remotely connected via the Internet. These devices may communicate with each other and the controller to, for example, improve their efficiency, their convenience, and/or their usability.

SUMMARY

As described herein, a control system may comprise a plurality of audio output devices (e.g., controllable speakers), and a remote control device having at least one button for selecting a preset, where the preset defines different commands for at least two of the audio output devices. The at least two audio output devices may be configured to be controlled according to the different commands in response to an actuation of the button of the remote control device. The command of the preset may comprise commands for starting playback, pausing playback, stopping playback, muting playback, unmuting playback, adjusting volume, changing channels, changing equalizer settings, enabling audio output devices, and disabling audio output devices. The remote control device may be configured to wirelessly transmit a message in response to the actuation of the button.

The control system may also comprise a system bridge configured to receive the message transmitted by the remote control device and to transmit commands according to the preset to the at least two of the audio output devices. The system bridge may be configured to dynamically group the at least two audio remote control devices together and subsequently transmit at least one command for controlling the grouped remote control devices. The system bridge may be configured to transmit a different command to each of the at least two of the audio output devices. The system bridge may be configured to cause at least one audio output device to play an alert sound, for example, when a limit of a streaming service has been reached or when the end of an album, a playlist, and/or a podcast has been reached.

The control system may also comprise one or more load control devices, such as a dimmer configured to control an intensity of a lighting load. The dimmer may also be responsive to the preset selected in response to the actuation of the button of the remote control device. The dimmer may be configured to adjust the intensity of the lighting load to a predetermined intensity in response to the actuation of the button of the remote control device to select the preset. The system bridge may be configured to cause at least one audio output device to play a feedback signal indicating an operational characteristic of the dimmer.

DETAILED DESCRIPTION

Figure 1:
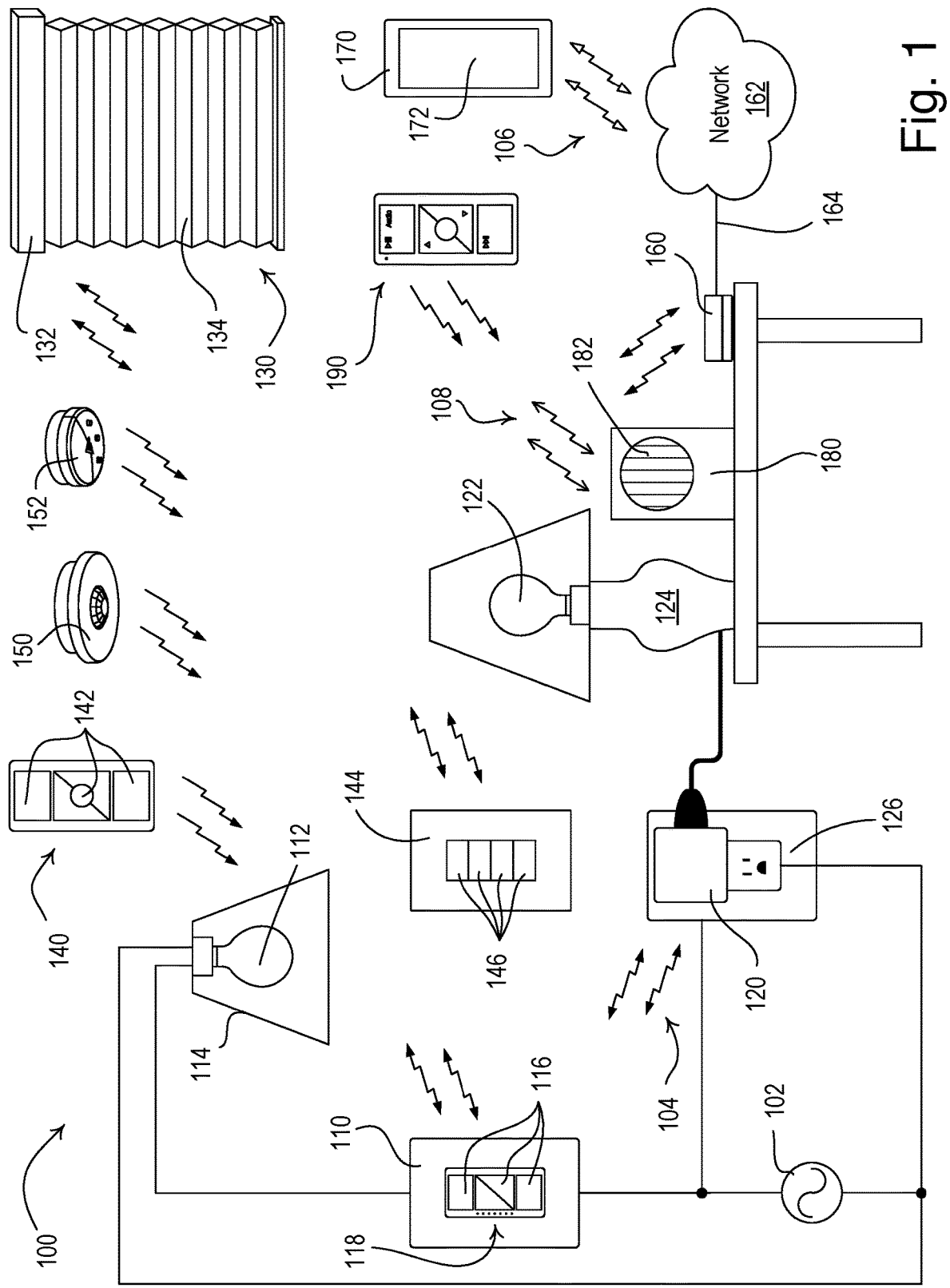
FIG. 1 is a simple diagram of an example load control system for controlling one or more electrical loads.

FIG. 1 is a simple diagram of an example control system, such as, a load control system 100 (e.g., a lighting control system) for controlling the amount of power delivered from an alternating-current (AC) power source to one or more electrical loads. The load control system 100 may comprise a first load control device, e.g., a wall-mounted dimmer 110, coupled in series electrical connection between the AC power source 102 and a first lighting load, e.g., a first light bulb 112 installed in a ceiling mounted downlight fixture 114. Alternatively, the first light bulb 112 could be installed in a wall-mounted lighting fixture or other lighting fixture mounted to another surface. The dimmer 110 may be adapted to be wall-mounted in a standard electrical wallbox. The load control system 100 may also comprise a second load control device, e.g., a plug-in load control device 120, coupled in series electrical connection between the AC power source 102 and a second lighting load, e.g., a second light bulb 122 installed in a lamp (e.g., a table lamp 124). Specifically, the plug-in load control device 120 may be plugged into an electrical receptacle 126 that is powered by the AC power source 102 and the table lamp 124 may be plugged into the plug-in load control device. Alternatively, the second light bulb 122 could be installed in a table lamp or other lamp that may be plugged into the plug-in load control device 120. The plug-in load control device 120 could alternatively be implemented as a table-top load control device or a remotely-mounted load control device. The load control system 100 may also comprise electronic switches configured to only turn on and off controlled lighting loads.

The dimmer 110 may comprise a plurality of actuators 116 (e.g., buttons) for controlling the light bulb 112. In response to actuation of the actuators 116, the dimmer 110 may be configured to turn the light bulb 112 on and off, and to increase or decrease the amount of power delivered to the light bulb and thus increase or decrease the intensity of the light bulb from a minimum intensity (e.g., approximately 1%) to a maximum intensity (e.g., approximately 100%). The dimmer 110 may further comprise a plurality of visual indicators 118, e.g., light-emitting diodes (LEDs), which are arranged in a linear array and illuminated to provide feedback of the intensity of the light bulb 112. The dimmer 110 may be configured to receive messages (e.g., digital messages) via wireless signals, e.g., radio-frequency (RF) signals 104, and to control the lighting load 112 in response to the received messages. Examples of wall-mounted dimmers are described in greater detail in U.S. Pat. No. 5,248,919, issued Sep. 29, 1993, entitled LIGHTING CONTROL DEVICE, and U.S. Pat. No. 9,679,696, issued Jun. 13, 2017, entitled WIRELESS LOAD CONTROL DEVICE, the entire disclosures of which are hereby incorporated by reference.

The load control system 100 may also comprise a daylight control device, e.g., a motorized window treatment 130, mounted in front of a window for controlling the amount of daylight entering the space in which the load control system 100 is installed. The motorized window treatment 130 may comprise, for example, a cellular shade, a roller shade, a drapery, a Roman shade, a Venetian blind, a Persian blind, a pleated blind, a tensioned roller shade system, or other suitable motorized window covering. The motorized window treatment 130 may comprise a motor drive unit 132 for adjusting the position of a covering material 134 of the motorized window treatment (e.g., a cellular shade fabric as shown in FIG. 1) in order to control the amount of daylight entering the space. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may further comprise one or more input devices (e.g., RF transmitters) configured to transmit messages via the RF signals 104. For example, the input device may comprise a lighting remote control device 140 (e.g., battery-powered handheld remote control device), a keypad device 144 (e.g., a wall-mounted remote control device), an occupancy sensor 150, or a daylight sensor 152. The dimmer 110, the plug-in load control device 120, and/or the motorized window treatment 130 may be configured to receive messages via the RF signals 104 transmitted by the lighting remote control device 140, the occupancy sensor 150, or the daylight sensor 152. In response to the received messages, the dimmer 110 and the plug-in load control device 120 may each be configured to turn the respective light bulb 112, 122 on and off, and/or to increase or decrease the intensity of the respective light bulb. In addition, the motor drive unit 132 of the motorized window treatment 130 may be configured to adjust the position of the covering material 134 to control the amount of daylight entering the space in response to the messages received via the RF signals 104.

The lighting remote control device 140 may comprise one or more buttons 142 (e.g., one or more of an on button, an off button, a raise button, a lower button, and a preset button). The lighting remote control device 140 may be a handheld remote control. Alternatively, the lighting remote control device 140 could be mounted vertically to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHT-LIGHT, the entire disclosures of which are hereby incorporated by reference. The keypad device 144 may comprise one or more buttons 146, which may allow for the selection of one or more presets.

The lighting remote control device 140 and the keypad device 144 may transmit RF signals 104 in response to actuations of one or more of the respective buttons 142, 146. For example, the RF signals 104 may be transmitted using a proprietary RF protocol, such as the ClearConnect® protocol, or a standard protocol, such as ZIGBEE, Z-WAVE, and KNX-RF protocols. In addition, the RF signals 104 may be transmitted, for example, using a standard wireless technology, for example, one of Wi-Fi, Bluetooth, and Near Field Communication (NFC) technologies. All messages transmitted by the lighting remote control device 140 and/or the keypad device 144 may include a command and identifying information, for example, a serial number (e.g., a unique identifier) associated with the remote control device. For example, the lighting remote control device 140 may be assigned to the dimmer 110, the plug-in load control device 120, and/or the motorized window treatment 130 during a configuration procedure of the load control system 100, such that the dimmer 110, the plug-in load control device 120, and/or the motorized window treatment 130 are responsive to messages transmitted by the lighting remote control device 140 via the RF signals 104. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The occupancy sensor 150 may be configured to detect occupancy and vacancy conditions in the space in which the load control system 100 is installed. The occupancy sensor 150 may transmit messages to the dimmer 110 and/or the plug-in load control device 120 via the RF signals 104 in response to detecting the occupancy or vacancy conditions. For example, the dimmer 110 and/or the plug-in load control device 120 may each be configured to turn on the respective light bulb 112, 122 in response to receiving an occupied command, and to turn off the respective light bulb in response to receiving a vacant command. Alternatively, the occupancy sensor 150 may operate as a vacancy sensor to only turn off the lighting loads in response to detecting a vacancy condition (e.g., to not turn on the light bulbs 112, 122 in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 152 may be configured to measure a total light intensity in the space in which the load control system is installed. The daylight sensor 152 may transmit messages including the measured light intensity to the dimmer 110, the plug-in load control device 120, and/or the motorized window treatment 130 via the RF signals 104 for controlling the intensities of the respective light bulbs 112, 122 and/or the position of the covering material 134 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may further comprise a system bridge 160 (e.g., a gateway device) configured to enable communication with a network 162, e.g., a wireless or wired local area network (LAN). The system bridge 160 may be connected to a router (not shown) via a wired digital communication link 164 (e.g., an Ethernet communication link). The router may allow for communication with the network 162, e.g., for access to the Internet. Alternatively, the system bridge 160 may be wirelessly connected to the network 162, e.g., using Wi-Fi technology.

The system bridge 160 may be configured to transmit the RF signals 104 to the dimmer 110, the plug-in load control device 120, and/or the motorized window treatment 130 (e.g., using the proprietary protocol) for controlling the respective light bulbs 112, 122 and/or the position of the covering material 130 in response to messages received from external devices via the network 162. The system bridge 160 may be configured to receive the RF signals 104 from the dimmer 110, the plug-in load control device 120, the motorized window treatment 130, the lighting remote control device 140, the occupancy sensor 150, and/or the daylight sensor 152, and to transmit messages via the network 162 for providing data (e.g., status information) to external devices. The system bridge 160 may operate as a central controller for the load control system 100, or may simply relay messages between the control devices of the load control system and the network 162.

The dimmer 110, the plug-in load control device 120, and/or the motorized window treatment 130 may be controlled according to presets (e.g., predetermined presets) in response to actuations of the buttons 146 of the keypad device 144. For example, the light bulbs 112, 122 may be controlled to the predetermined intensities (e.g., the same or different intensities) and the covering material 134 of the motorized window treatment 130 may be controlled to a predetermined position in response to the actuation of a single one of the buttons 146 of the keypad device 144. For example, the keypad device 144 may transmit a message including a preset command, and the dimmer 110, the plug-in load control device 120, and/or the motorized window treatment 130 may be responsive to the preset command received from the keypad device (e.g., the dimmer 110, the plug-in load control device 120, and/or the motorized window treatment 130 may have the predetermines intensities and/or positions of the preset stored locally). In addition, the system bridge 160 may receive the preset command from the keypad device 144 and may transmit messages including commands according to the predetermines intensities and/or positions of the preset to the dimmer 110, the plug-in load control device 120, and/or the motorized window treatment 130.

The load control system 100 may further comprise a network device, such as, a smart phone 170 (e.g., an iPhone® smart phone, an Android® smart phone, or a Blackberry® smart phone). The smart phone 170 may be operable to transmit messages in one or more Internet Protocol packets to the system bridge 160 via RF signals 106 either directly or via the network 162. For example, the smart phone 170 may transmit the RF signals 106 to the system bridge 160 via a Wi-Fi communication link, a Wi-MAX communications link, a Bluetooth® communications link, a near field communication (NFC) link, a cellular communications link, a television white space (TVWS) communication link, or any combination thereof. The load control system 100 may comprise other types of network devices configured to communicate via the network 162, such as, a personal computer, a laptop, a wireless-capable media device (e.g., MP3 player, gaming device, or television), a tablet device (for example, an iPad® hand-held computing device), a Wi-Fi or wireless-communication-capable television, or any other suitable Internet-Protocol-enabled device. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The smart phone 170 may have a visual display 172, which may comprise a touch screen having, for example, a capacitive touch pad displaced overtop the visual display, such that the visual display may display soft buttons that may be actuated by a user. The smart phone 170 may comprise a plurality of hard buttons, e.g., physical buttons (not shown), in addition to the visual display 172. The smart phone 170 may execute a product control application for allowing a user of the smart phone to monitor and control the lighting control system 100. In response to actuations of the displayed soft buttons or hard buttons, the smart phone 170 may transmit messages to the system bridge 160 through the wireless communications described herein. The smart phone 170 may transmit messages to the system bridge 160 via the RF signals 106 for controlling the dimmer 110, the plug-in load control device 120, and/or the motorized window treatment 130. The system bridge 160 may be configured to transmit RF signals 106 to the smart phone 170 in response to messages received from the dimmer 110, the plug-in load control device 120, the motorized window treatment 130, the lighting remote control device 140, the occupancy sensor 150, and/or the daylight sensor 152 (e.g., using the proprietary protocol) for displaying data (e.g., status information) on the visual display 172 of the smart phone.

The operation of the load control system 100 may be programmed and configured using the smart phone 170. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The load control system 100 may comprise one or more other types of load control devices, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an amplifier; an elevator; a power supply; a generator; an electric charger, such as an electric vehicle charger; and an alternative energy controller.

In addition, the load control system 100 may comprise other types of input devices, such as, for example, temperature sensors, humidity sensors, radiometers, cloudy-day sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

The load control system 100 may further comprise one or more audio control devices, such as a controllable audio output device 180 (e.g., a controllable speaker). The audio output device 180 may comprise a speaker 182 for emitting audible sounds (e.g., music, voice, etc.). The audio output device 180 may be a stand-alone unit that may be placed on a floor or a table as shown in FIG. 1. In addition, the audio output device 180 may be wall-mounted or ceiling-mounted, and/or may be integrated into the building structure. Further, one or more of the control devices of the load control system 100 (e.g., the dimmer 110, the plug-in load control device 120, the motorized window treatment 130, the keypad device 144, the system bridge 160, etc.) may include speakers and may be configured to operate as audio output devices. The audio output device 180 may be configured to transmit and receive RF signals 108, for example, from the system bridge 160, the network 162, and/or from an audio playback device (not shown). The RF signals may be transmitted using a proprietary or standard protocol. The audio output device 180 may be configured to receive via the RF signals 108 audio signals for playback. The audio output device 180 may be configured to stream and play audio recordings from a free or subscription streaming service. The audio output device 180 may also be configured to receive commands, e.g., for starting, pausing, or stopping playback of audio recordings, skipping tracks, and/or adjusting volume.

Figure 2:
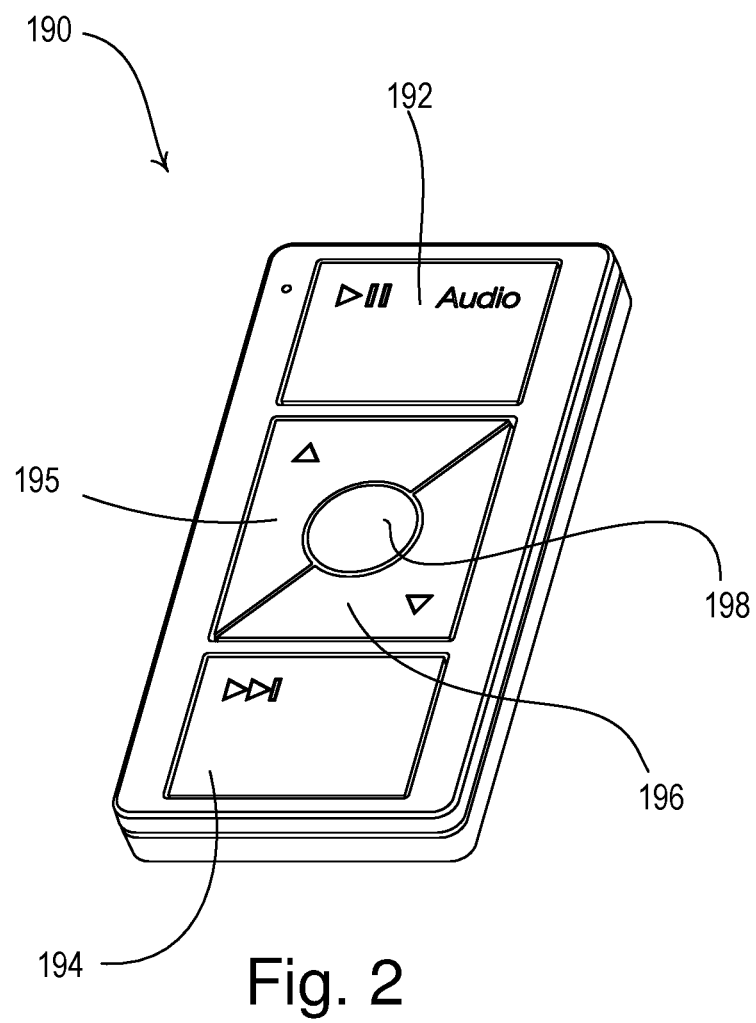
FIG. 2 is an example perspective view of an audio remote control device of the load control system of FIG. 1.

The load control system 100 may further comprise an audio remote control device 190 for controlling the controllable audio output device 180. FIG. 2 is an example perspective view of the audio remote control device 190. The audio remote control device 190 may comprise a plurality of actuators, e.g., a play/pause button 192, a skip button 194, a raise volume button 195, a lower volume button 196, and a channel selection button 198. The audio remote control device 190 may be configured to transmit RF signals (e.g., RF signals 104 or RF signals 108) in response to actuations of the buttons 192-198. For example, the audio remote control device 190 may be configured to transmit a message to the system bridge 160 via the RF signals 104 in response to an actuation of one the buttons 190-198 and the system bridge may be configured to subsequently transmit a message including a command to the audio output device 180 via the RF signals 108. In addition, the audio remote control device 190 could comprise a visual display (not shown), such as, for example, a light bar and/or one or more LEDs, for providing feedback to a user (e.g., feedback of the present volume of one or more of the audio output devices 190).

The audio output device 180 may be configured to play and pause the playback of an audio recording in response to successive actuations of the play/pause button 192 of the audio remote control device 190. In addition, the audio output device 180 may be configured to mute and unmute the playback of an audio stream (e.g., a live audio stream) in response to successive actuations of the play/pause button 192 of the audio remote control device 190. The audio output device 180 may be configured to skip to the next track of the audio recording in response to actuations of the skip button 194. The audio output device 180 may be configured to increase and decrease the volume of the playback of the audio recording in response to actuations of the raise volume button 195 and the lower volume button 196, respectively. The audio output device 180 may be configured to change a channel or playlist in response to actuations of the channel selection button 198. For example, the audio output device 180 may be configured to change to the next channel or playlist from a list of favorite channels or playlists in response to an actuation of the channel selection button 198. In addition, the audio output device 180 may be configured to change to a favorite channel or playlist in response to an actuation of the channel selection button 198. The audio remote control device 190 could also include a rotary knob for adjusting the volume of the audio output devices 180.

The system bridge 160 may be configured to cause the audio output device 180 to play secondary audio signals (e.g., feedback or alert sounds or messages) in addition to the primary audio signals (e.g., music). The system bridge 160 may be configured to cause the audio output device 180 to play an alert sound at the same time that the primary audio signals are playing. For example, some free streaming services limit the operation of the playback options, e.g., by limiting the number of times that a user can skip a track and/or change a channel within a period of time. The system bridge 160 may be configured to cause the audio output device 180 to generate an alert sound when a limit of a streaming service is reached. In addition, the system bridge 160 may be configured to cause the audio output device 180 to generate an alert sound when the end of an album, a playlist, and/or a podcast is reached. The system bridge 160 may be configured to cause the audio output device 180 to generate an alert sound if a received command (e.g., selected in response to an actuation of one of the buttons 190-198 of the audio remote control device 190) is incompatible with the type of audio recording or audio stream being played by the audio output device 180, for example, if the skip button 194 is actuated while the audio output device 180 is playing a live audio stream. Further, the system bridge 160 may be configured to cause the audio output device 180 to generate an alert sound if an error occurs (e.g., playback of an audio recording or an audio stream has failed).

The system bridge 160 may be configured to cause the audio output device 180 to play a message instead of playing the primary audio signal. For example, when a user connects to the system bridge 160 to configure and program the load control system 100 (e.g., during a configuration procedure), the system bridge 160 may be configured to stop playback of an audio recording and play an instruction messages for instructing the user how to configure the load control system, install a load control device (e.g., the dimmer 110), resolve an error or fault condition, or other instruction message.

The system bridge 160 may be configured to cause the audio output device 180 to play a feedback signal regarding the status of the control devices of the load control system 100. For example, the system bridge 160 may be configured to cause the audio output device 180 to play a speech signal that indicates an operational characteristic of one or more of the control devices of the load control system 100, such as, for example, the state (e.g., on or off) and/or the intensity or power level of the first light bulb 112 and/or the second light bulb 122. In addition, the system bridge 160 may be configured to cause the audio output device 180 to play a speech signal that announces the execution and/or completion of a command (e.g., to announce a selected scene). The system bridge 160 may be configured to cause the audio output device 180 to play a speech signal that reports a detected state and/or measurement determined by an input device, such as the occupancy sensor 150 and/or the daylight sensor 152. Further, the system bridge 160 may be configured to cause the audio output device 180 to play a speech signal that reports information regarding the performance of the load control system (e.g., energy savings information) to the user.

The system bridge 160 may be configured to receive messages from the audio remote control device 190 in response to actuations of the raise and lower volume buttons 195, 196 and to transmit messages to the audio output device 180 to appropriately adjust the volume of the playback of the audio recording of the audio output device 180. The system bridge 160 may be configured to transmit "go-to volume level" commands to the audio output device 180 to cause the audio output device to adjust the volume to a specific level. The system bridge 160 may continue to adjust the volume of the audio output device 180 as long as the raise and/or lower volume buttons 195, 196 are pressed and held. For example, the audio remote control device 190 may transmit a "raise volume" command when the raise volume button 195 is first depressed and may transmit a "stop volume adjustment" command when the raise volume button 195 is released. In response to receiving a "raise volume" command from the audio remote control device 190, the system bridge 160 may be configured to begin periodically transmitting "go-to volume level" commands (e.g., every 0.25 seconds) until the system bridge 160 receives a "stop volume adjustment" command from the audio remote control device 190. The system bridge 160 may stop periodically transmitting the "go-to volume level" commands in response to receiving a "stop volume adjustment" command from the audio remote control device 190. The system bridge 160 and the audio output device 180 may operate in a similar manner when the lower volume button 196 is depressed. The system bridge 160 may increase or decrease the volume by a predetermined amount (e.g., approximately 5% of the entire volume range) each time that the system bridge transmits a "go-to volume level" commands while the raise and/or lower volume button 195, 196 is depressed. The system bridge 160 may limit the volume of each audio output device 180 between a maximum volume and/or a minimum volume.

Figure 3:
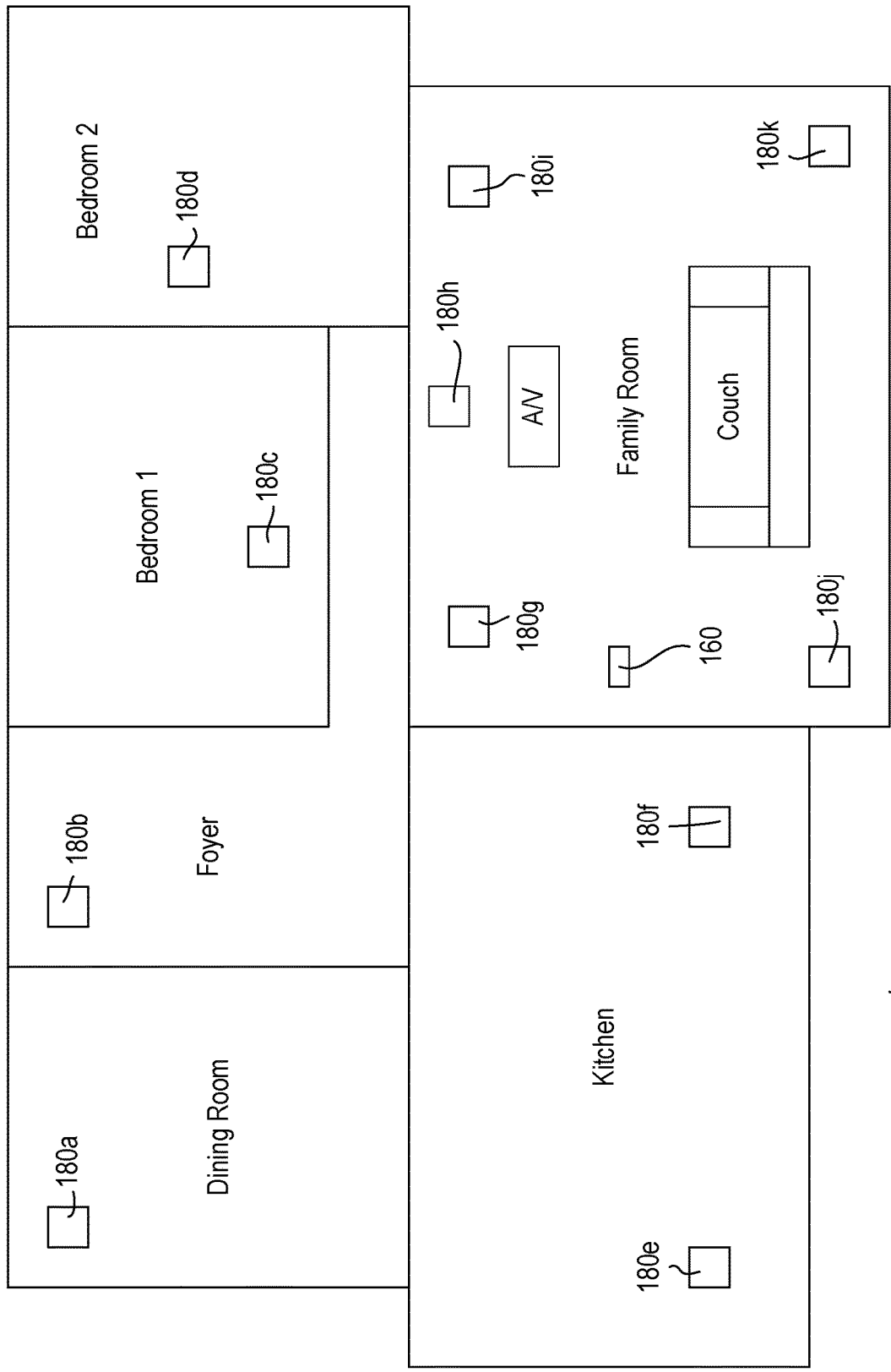
FIG. 3 is an example floorplan of a building (e.g., a home) in which the load control system of FIG. 1 may be installed.

The load control system 100 may comprise a plurality of audio output devices 180 located at a plurality of locations (e.g., in a number of different rooms) of a building. FIG. 3 is an example floorplan of a building 200 (e.g., a home) in which the load control system 100 of FIG. 1 may be installed. The system bridge 160 may be located near the center of the building 200. The load control system 100 may include a number of audio output devices 180A-180K, which may be located in the various rooms of the building 200.

Two or more of the audio output devices 180 may be linked together as a bonded set. All of the audio output devices 180 of a bonded set may play the same audio recordings at the same volume, and may respond in the same way to messages received in response to actuations of the buttons of the audio remote control device 190. For example, the audio output devices 180e, 180f in the kitchen may be linked together in a bonded set and may always operate in unison.

The audio output devices 180 may also be controlled according to presets (e.g., in response to actuations of the buttons 146 of the keypad device 144). The keypad device 144 may transmit a message including a preset command to the system bridge 160, which may transmit messages including commands for controlling the audio output devices 180 according to the preset. For example, playback of audio recordings may be started, paused, and/or stopped, volume may be adjusted, and/or channels may be changed in response to the selection of a preset. In addition, one or more of the audio output device 180 may be enabled or disabled in response to the selection of a preset. For example, playback on the audio output devices 180a, 180b, 180e-180k in the dining room, foyer, kitchen, and family room may be started (e.g., at a specific volume level and channel) and playback on the audio output devices 180c, 180d in the bedrooms may be stopped and/or the audio output devices 180c, 180d may be disabled in response to the selection of an "entertain" preset. The audio output devices 180A-180K in the building 200 may be controlled to different volumes in response to the selection of a preset. The volume of the audio output devices 180e-180k in the kitchen and family room may be controlled to a greater level than the volume of the audio output devices 180a, 180b in the dining room and foyer in response to the selection of the "entertain" preset. The volume of the audio output devices 180g-180k in the family room may be controlled to different levels to adjust the right/left balance and/or front/rear balance. In addition, equalizer settings of the audio output devices 180A-180K may be adjusted to different levels in response to the selection of a preset. Further, the dimmer 110, the plug-in load control device 120, the motorized window treatment 130, and/or the audio output devices 180 may all be controlled together in response to the selection of a preset. For example, the presets may be programmed using the smart phone 170.

Figure 4:
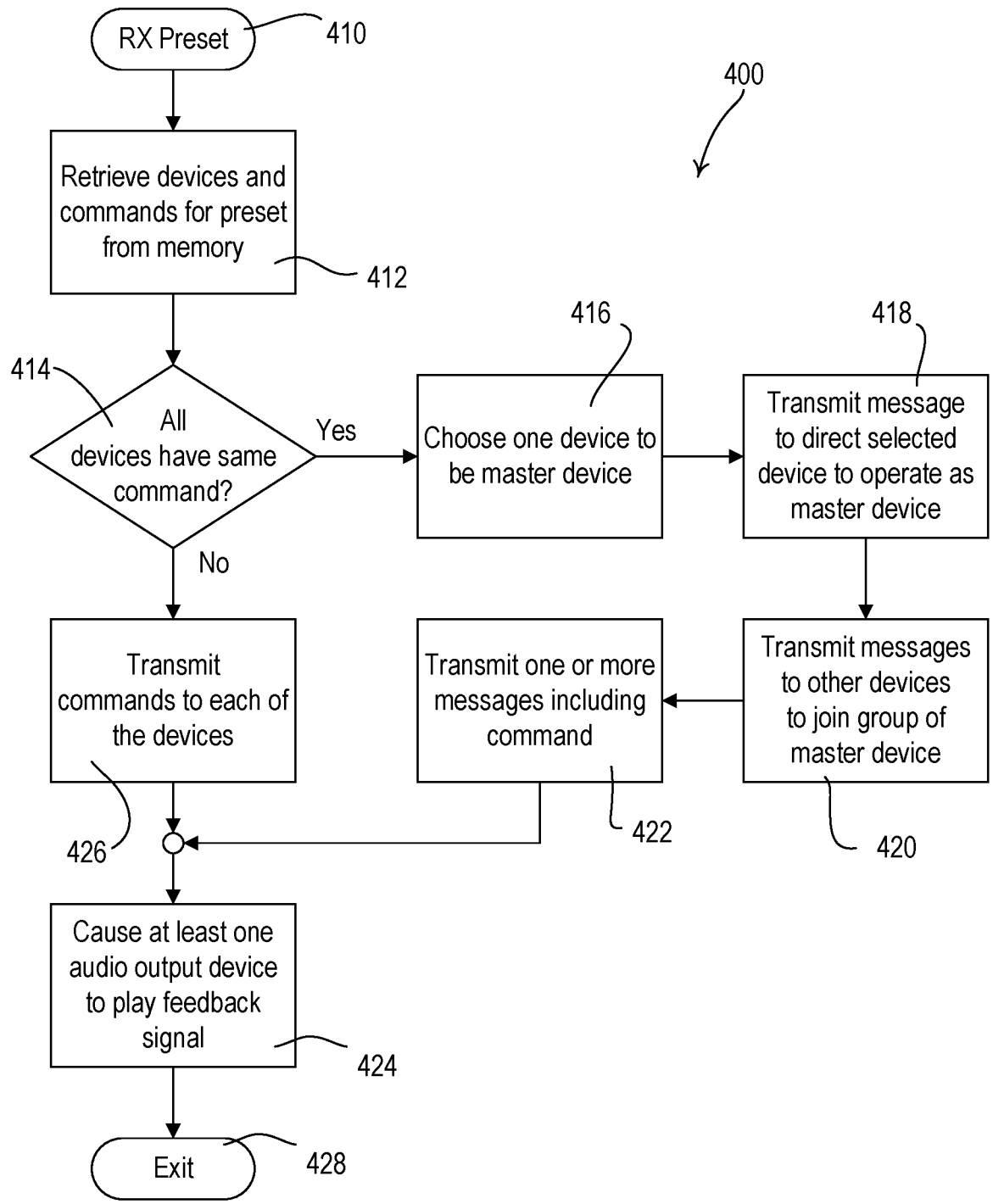
FIG. 4 is a simplified flowchart of an example control procedure that may be executed by a control device of a control system having audio output devices.

The audio output devices 180 may be dynamically grouped together in order to be controlled according to the selected presets. FIG. 4 is a simplified flowchart of an example control procedure 400 that may be executed by a control device of a control system, for example, the system bridge 160 of the load control system 100 shown in FIG. 1. For example, the control device may execute the control procedure 400 when the control device receives a message including an indication of a selected preset from an external device (e.g., in a message transmitted by the keypad device 144 in response to the actuation of one of the buttons 146) at 410. The control device may have stored in memory programming data for each preset. For example, the programming data for each preset may comprise the unique identifiers of the devices that are included in the preset (e.g., the audio output devices 180 and/or other control devices) and corresponding commands that are part of the preset (e.g., commands for starting, pausing, and/or stopping playback, adjusting volume, changing channels, changing equalizer settings, enabling and/or disabling audio output devices, and/or other audio commands).

At 412, the control device may recall from memory the devices that are included in the preset as well as the commands that are part of the preset. If all of the devices that are included in the preset have the same command (e.g., a command to adjust volume) at 414, the control device may choose one of the devices that have the same command (e.g., one of the audio output devices 180) to be a master device for the group of devices of the preset (e.g., the dynamic group at 416. The control device may transmit a message to the selected device to direct the selected device to operate as the master device of the dynamic group at 418, and may then transmit a message to each of the other devices included in the preset to add those devices to the dynamic group of the master device (e.g., to point the other devices to the master device) at 420. The control device may then transmit one or more messages including the command of the preset to the master at 422, which may allow all of the devices of the dynamic group may respond to the command transmitted by the control device (e.g., in unison). At 424, the control device may cause at least one of the audio output devices to play a feedback signal (e.g., a speed signal that announces the selected scene), before the control procedure 400 exits at 428. If all of the devices that are included in the preset do not have the same command at 414, the control device may transmit separate messages to each of the devices (e.g., to set the audio output devices to different volume levels) at 426, before the control device causes the feedback signal to be generated at 424 and the control procedure 400 exits at 428.

Figure 5:
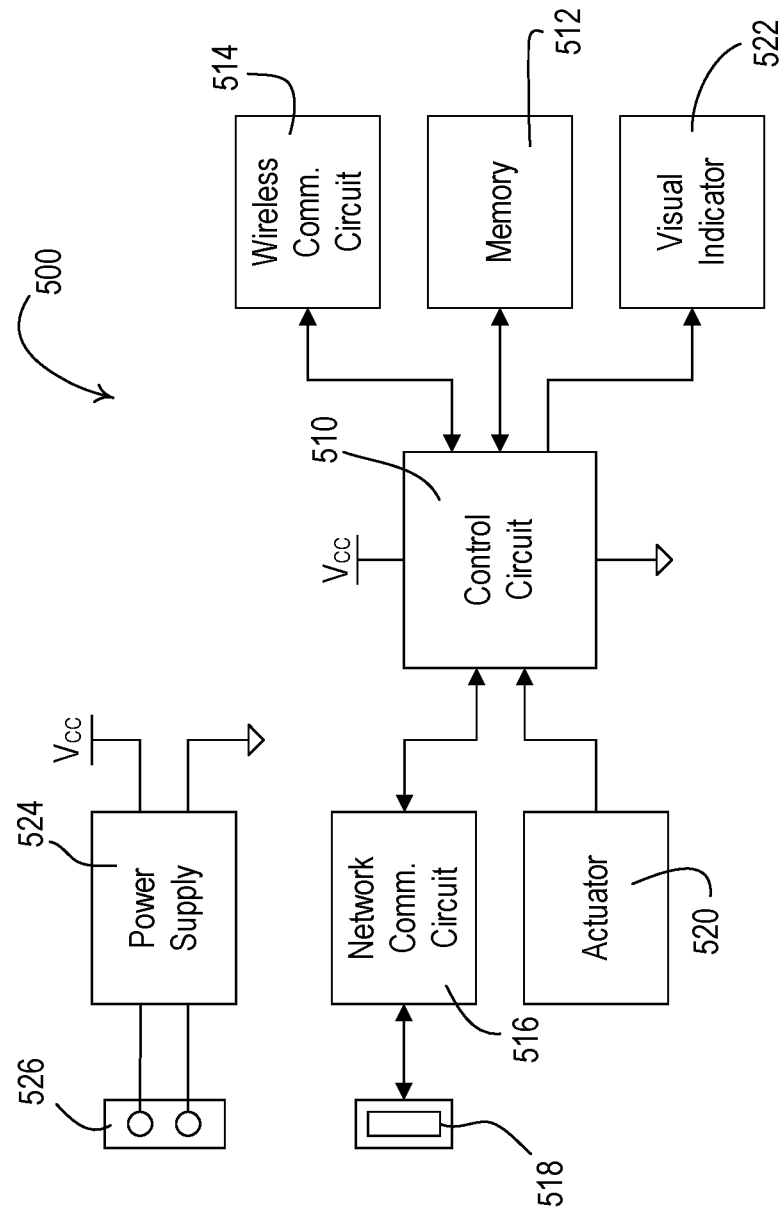
FIG. 5 is a simplified block diagram of an example control device, for example, a system bridge of the load control system of FIG. 1.

FIG. 5 is a simplified block diagram of an example control device 500, which may be deployed as, for example, the system bridge 160 of the load control system 100 shown in FIG. 1. The control device 500 may comprise a control circuit 510, which may include one or more of a processor (e.g., a microprocessor), a microcontroller, a programmable logic device (PLD), a field programmable gate array (FPGA), an application specific integrated circuit (ASIC), or any suitable processing device. The control circuit 510 may be coupled to a memory 512 for storage of operational parameters of the control device 500. The memory 512 may be implemented as an external integrated circuit (IC) or as an internal circuit of the control circuit 510.

The control device 500 may comprise a wireless communication circuit 514, for example, including an RF transceiver coupled to an antenna for transmitting and receiving RF signals (e.g., the RF signals 104 shown in FIG. 1) using a proprietary protocol (e.g., the ClearConnect® protocol). The control circuit 510 may be coupled to the wireless communication circuit 514 for transmitting messages via the RF signals 104, for example, to control the dimmer 110, the plug-in load control device 120, and/or the motorized window treatment 130. The control circuit 510 may also be configured to receive messages from, for example, the dimmer switch 110, the plug-in load control device 120, the motorized window treatment 130, the remote control device 140, the occupancy sensor 150, and/or the daylight sensor 152 via the wireless communication circuit 514. For example, the control circuit 510 may be operable to receive a message including the intensity of a lighting load (e.g., one of the light bulbs 112, 122 of the load control system 100 shown in FIG. 1), and to transmit a message including the intensity of the lighting load to the audio output device 180, e.g., for causing the audio output device to play a feedback signal indicating the intensity of the lighting load.

The control device 500 may further comprise a network communication circuit 516 coupled to a network connector 518 (e.g., an Ethernet jack), which may be adapted to be connected to a wired digital communication link (e.g., an Ethernet communication link) for allowing the control circuit 510 to communicate with network devices on a network (e.g., a local area network, such as the network 162 shown in FIG. 1). Alternatively, the network communication circuit 516 may be configured to be wirelessly connected to the network, e.g., using Wi-Fi technology to transmit and receive RF signals (e.g., the RF signals 106, 108 shown in FIG. 1). The control circuit 510 may be configured to transmit messages to audio output devices (e.g., the audio output devices 180) via the network communication circuit 516 in response to receiving a message from, for example, a remote control device (e.g., a message transmitted by the remote control device 140 in response to an actuation of one of the buttons 142).

The control circuit 510 may be responsive to an actuator 520 for receiving a user input. For example, the control circuit 510 may be operable to associate the control device 500 with one or more control devices of the load control system in response to actuations of the actuator 520 during a configuration procedure of the load control system. The control circuit 510 may store the unique identifiers (e.g., the serial numbers) of the control devices to which the control device 500 is associated in the memory 512. The control device 500 may comprise additional actuators to which the control circuit 510 is responsive.

The control circuit 510 may illuminate a visual indicator 522 to provide feedback to a user of the load control system. For example, the control circuit 510 may blink or strobe the visual indicator 522 to indicate a fault condition. In addition, the control circuit 510 may be operable to illuminate the visual indicator 522 different colors to indicator different conditions or states of the control device 500. The visual indicator 522 may be illuminated by, for example, one or more light-emitting diodes (LEDs). Alternatively, the control device 500 may comprise more than one visual indicator.

The control device 500 may further comprise a power supply 524 for generating a DC supply voltage Vcc for powering the control circuit 510, the memory 512, the wireless communication circuit 514, the network communication circuit 516, and other circuitry of the control device. The power supply 524 may be coupled to a power supply connector 526 (e.g., a micro-USB port) for receiving a supply voltage (e.g., a DC voltage) and for drawing current from an external power source.

What is claimed is:
1. A load control bridge controller, comprising:
memory circuitry;
communication interface circuitry;
a user interface; and
control circuitry operatively coupled to the memory circuitry, the communication interface circuitry, and the user interface, the control circuitry to, responsive to receipt of an input that includes data indicative of a user selection via the user interface of one of a plurality of preset commands:
retrieve, from the memory circuitry, a respective command for each of a plurality of load devices included in the selected preset command, wherein the plurality of load devices includes at least one audio output device;

determine whether the retrieved commands for each of the plurality of load devices included in the selected preset command are identical;

responsive to the determination that the retrieved commands are identical:

select one of the plurality load devices as a master device;

cause a communication, via the communication interface circuitry, of a command assigning the selected one of the plurality of load devices as the master load device;

cause a communication, via the communication interface circuitry to each of the remaining plurality of load devices, of a message that causes each of the remaining plurality of load devices to form a group with the master load device;

cause a communication, via the communication interface circuitry, of a distribution command to the selected master load device, the distribution command to cause the master load device to communicate the retrieved command to each of the remaining plurality of load devices included in the group.

2. The load control system of claim 1, wherein the retrieved command causes the at least one audio output device to generate an audible output corresponding to the retrieved command.

3. The load control system of claim 1, the control circuitry to further:

responsive to the determination that the retrieved commands are not identical:

cause a communication, via the communication interface circuitry of the respective retrieved command to each of the plurality of load devices.

4. The load control system of claim 3:

wherein the at least one audio output device comprises a first audio output device and a second audio output device; and wherein preset command includes setting the first audio output device to a first output level and the second audio output device to a second output level different than the first output level.

5. The load control system of claim 3:

wherein the plurality of load devices includes an operatively coupled controllably conductive device;

wherein the preset command includes one or more instructions to cause the controllably conductive device to provide a power at a first power level to an electrical load; and wherein the preset command further includes one or more instructions to cause the at least one audio output device to generate an audio output associated with the first power level.

6. The load control system of claim 3:

wherein the plurality of load devices includes an operatively coupled adjustable window treatment;

wherein the preset command includes one or more instructions to cause the adjustable window treatment to travel to a first position; and wherein the preset command further includes one or more instructions to cause the at least one audio output device to generate an audio output associated with the first position.

7. A method of controlling a plurality of load devices that includes at least one audio output device, the method comprising:

receiving, by system bridge control circuitry via a user interface, an input that includes data indicative of a user selection of one of a plurality of preset commands;

retrieving, by system bridge control circuitry from operatively coupled memory circuitry, a respective command for each of the plurality of load devices included in the selected preset command, wherein the plurality of load devices includes at least one audio output device;

determining, by the system bridge control circuitry, whether the retrieved commands for each of the plurality of load devices included in the selected preset command are identical and responsive to the determination that the retrieved commands are identical:

selecting one of the plurality load devices as a master device;

causing a communication, via operatively coupled communication interface circuitry, of a command assigning the selected one of the plurality of load devices as the master load device;

causing a communication, via the communication interface circuitry to each of the remaining plurality of load devices, of a message that causes each of the remaining plurality of load devices to form a group with the master load device; and causing a communication, via the communication interface circuitry, of a distribution command to the selected master load device, the distribution command to cause the master load device to communicate the retrieved command to each of the remaining plurality of load devices included in the group.

8. The method of claim 7, further comprising:

causing the at least one audio output device to generate an audible output corresponding to the retrieved command.

9. The method of claim 7, further comprising:

responsive to the determination that the retrieved commands are not identical:

causing a communication of the respective retrieved command to each of the plurality of load devices via the communication interface circuitry.

10. The method of claim 9 wherein causing the communication of the respective retrieved command to each of the plurality of load devices via the communication interface circuitry further comprises:

causing a communication of a first retrieved command to a first audio output device, the first retrieved command to cause the first audio output device to produce an audio output at a first output level; and causing a communication of a second retrieved command to a second audio output device, the second retrieved command to cause the second audio output device to produce an audio output at a second output level different than the first output level.

11. The method of claim 9 wherein causing the communication of the respective retrieved command to each of the plurality of load devices via the communication interface circuitry further comprises:

causing a communication of a first retrieved command to an operatively coupled controllably conductive device, the first retrieved command to cause the controllably conductive device to provide a power at a first power level to an electrical load; and causing a communication of a second retrieved command to the at least one audio output device, the second retrieved command to cause the at least one audio output device to produce an audio output associated with the first power level.

12. The method of claim 9 wherein causing the communication of the respective retrieved command to each of the plurality of load devices via the communication interface circuitry further comprises:
    causing a communication of a first retrieved command to an adjustable window treatment, the first retrieved command to cause the adjustable window treatment to travel to a first position; and
    causing a communication of a second retrieved command to the at least one audio output device, the second retrieved command to cause the at least one audio output device to produce an audio output associated with the first position.

13. A non-transitory, machine-readable, storage device that includes instructions that, when executed by system bridge control circuitry operatively coupled to a plurality of load devices that includes at least one audio output device, causes the control circuitry to, responsive to receipt, via a user interface, an input that includes data indicative of a user selection of one of a plurality of preset commands:
    retrieve from operatively coupled memory circuitry, a respective command for each of the plurality of load devices included in the selected preset command;
    determine whether the retrieved commands for each of the plurality of load devices included in the selected preset command are identical and responsive to the determination that the retrieved commands are identical:
    select one of the plurality load devices as a master device;
    cause a communication, via operatively coupled communication interface circuitry, of a command assigning the selected one of the plurality of load devices as the master load device;
    cause a communication, via the communication interface circuitry to each of the remaining plurality of load devices, of a message that causes each of the remaining plurality of load devices to form a group with the master load device; and
    cause a communication, via the communication interface circuitry, of a distribution command to the selected master load device, the distribution command to cause the master load device to communicate the retrieved command to each of the remaining plurality of load devices included in the group.

14. The non-transitory, machine-readable, storage device of claim 13 wherein the instructions, when executed by the system bridge control circuitry, further cause the control circuitry to:
    cause the at least one audio output device to generate an audible output corresponding to the retrieved command.

15. The non-transitory, machine-readable, storage device of claim 13 wherein the instructions, when executed by the system bridge control circuitry, further cause the control circuitry to, responsive to the determination that the retrieved commands are not identical:
    cause a communication of the respective retrieved command to each of the plurality of load devices via the communication interface circuitry.

16. The non-transitory, machine-readable, storage device of claim 15 wherein the instructions that cause the system bridge control circuitry to cause the communication of the respective retrieved command to each of the plurality of load devices further causes the control circuitry to:
    cause a communication of a first retrieved command to a first audio output device, the first retrieved command to cause the first audio output device to produce an audio output at a first output level; and
    cause a communication of a second retrieved command to a second audio output device, the second retrieved command to cause the second audio output device to produce an audio output at a second output level different than the first output level.

17. The non-transitory, machine-readable, storage device of claim 15 wherein the instructions that cause the system bridge control circuitry to cause the communication of the respective retrieved command to each of the plurality of load devices further causes the control circuitry to:
    cause a communication of a first retrieved command to an operatively coupled controllably conductive device, the first retrieved command to cause the controllably conductive device to provide a power at a first power level to an electrical load coupled to the controllably conductive device; and
    cause a communication of a second retrieved command to the at least one audio output device, the second retrieved command to cause the at least one audio output device to generate an audio output associated with the first power level.

18. The non-transitory, machine-readable, storage device of claim 15 wherein the instructions that cause the system bridge control circuitry to cause the communication of the respective retrieved command to each of the plurality of load devices further causes the control circuitry to:
    cause a communication of a first retrieved command to an operatively coupled adjustable window treatment, the first retrieved command to cause the adjustable window treatment to position the adjustable window treatment at a first position; and
    causing a communication of a second retrieved command to the at least one audio output device, the second retrieved command to cause the at least one audio output device to generate an audio output associated with the first position of the adjustable window treatment.

* * * * *